(12) United States Patent
Nakazawa et al.

(10) Patent No.: US 7,859,226 B2
(45) Date of Patent: Dec. 28, 2010

(54) METHOD AND DEVICE FOR SAFETY PROTECTION OF SECONDARY BATTERY

(75) Inventors: Hiroshi Nakazawa, Tokyo (JP); Masayuki Kato, Tokyo (JP); Yasuo Nagasawa, Tokyo (JP)

(73) Assignee: TDK-Lambda Corporation, Tokyo (JP)

( * ) Notice: Subject to any disclaimer, the term of this patent is extended or adjusted under 35 U.S.C. 154(b) by 696 days.

(21) Appl. No.: 11/778,865

(22) Filed: Jul. 17, 2007

(65) Prior Publication Data

US 2009/0021217 A1 Jan. 22, 2009

(51) Int. Cl.
*H02J 7/00* (2006.01)

(52) U.S. Cl. .................. 320/134; 320/150; 324/427

(58) Field of Classification Search ............... 320/134, 320/153
See application file for complete search history.

(56) References Cited

U.S. PATENT DOCUMENTS

| | | | | |
|---|---|---|---|---|
| 6,873,135 | B2 * | 3/2005 | Nakatsuji | 320/132 |
| 2002/0036482 | A1 * | 3/2002 | Nakatsuji | 320/152 |
| 2003/0137282 | A1 * | 7/2003 | Kainthla | 320/161 |
| 2004/0113587 | A1 * | 6/2004 | Bohne et al. | 320/128 |
| 2007/0099072 | A1 * | 5/2007 | Hennige et al. | 429/144 |

FOREIGN PATENT DOCUMENTS

| | | |
|---|---|---|
| JP | 08-222278 A | 8/1996 |
| JP | 08-331770 | 12/1996 |
| JP | 09266634 | 10/1997 |
| JP | 2861879 B2 | 12/1998 |
| JP | 11004548 | 1/1999 |
| JP | 2995142 B2 | 10/1999 |
| JP | 2001-157366 | 6/2001 |
| JP | 2001286064 | 10/2001 |
| JP | 2003-194897 A | 7/2003 |
| JP | 2003274570 | 9/2003 |
| JP | 2003308885 | 10/2003 |
| JP | 2003348766 | 12/2003 |
| JP | 2006-202567 A | 8/2006 |
| JP | 2006-228609 A | 8/2006 |
| JP | 2006-295995 A | 10/2006 |

\* cited by examiner

*Primary Examiner*—Edward Tso
*Assistant Examiner*—Arun Williams
(74) *Attorney, Agent, or Firm*—McDermott Will & Emery LLP

(57) ABSTRACT

A method and device for safety protection of a secondary battery capable of preventing smoking and ignition thereof. A lithium cell 1 as a chargeable and dischargeable secondary battery, a protection circuit 11 for shutting down charging power Pc at the time of overcurrent, overvoltage, etc., and an electric power restriction circuit 20 for limiting the charging power Pc input to the lithium cell 1 are incorporated into a battery pack 10. A battery charger 12, equipped with a stabilized electric source 13 and a charging circuit 14, inputting the charging power Pc to the lithium cell 1, is connected to a previous stage of the battery pack 10. The electric power restriction circuit 20 limits the charging power Pc within a boundary value Pmax of a safety operation region for safely using the lithium cell 1, thereby permitting the lithium cell 1 to operate safely under any conditions.

2 Claims, 13 Drawing Sheets

METHOD AND DEVICE FOR SAFETY PROTECTION OF SECONDARY BATTERY

FIELD OF THE INVENTION

The present invention relates to a method and device for safety protection of a secondary battery which are intended to safely use a chargeable and dischargeable secondary battery such as a lithium-ion battery or the like.

BACKGROUND OF THE INVENTION

Heretofore, a lead storage battery has been generally employed as a secondary battery. Recently, however, a lithium-ion battery which has extremely high power density as an electricity storage medium and can be downsized has been extensively employed. A lithium-ion battery, e.g., has a 4V charging voltage per cell, which is nearly twice as large as that of the lead storage battery. In other words, a lithium-ion battery has the advantage that half as many series-connected lithium-ion batteries as series-connected lead storage batteries are capable of producing the same charged voltage. Further, in order to obtain identical capacity and an equivalent charged voltage, a lithium-ion battery permits a downsized and weight-saved secondary battery to be built as compared to a lead storage battery.

FIG. 8 shows a structure of a laminate-type lithium-ion battery that is one representative type of lithium-ion batteries. A lithium-ion battery 1 has a structure where an insulating separator 4 is inserted between a positive-terminal material 2 such as, lithium cobaltate ($LiCoO_2$), lithium manganate ($LiMnO_2$) or the like, and a negative-terminal material 3 such as graphite (carbon) or the like, and then some of terminal material units thus assembled are stacked into a laminate body 5, which is, then sealed together with an electrolyte, with aluminum laminates 6 from upper and lower sides thereof. The positive-terminal material 2 and the negative-terminal material 3 are formed with a positive-terminal 2a and a negative-terminal 3a, respectively, and both the terminals protrude outside from where the aluminum laminates 6 are bonded. In the meantime, the lithium-ion battery 1 is often used in the form of a battery stack where a plurality of single cell stacks thus assembled are connected with one another, and there are no particular limitations to the way the terminals are protruded, the shape and material of the terminals, the whole size of the laminate battery.

Despite the extremely high power density as an electricity storage medium, the lithium-cell 1 of the foregoing structure is sensitive to handling conditions, in comparison with the lead storage battery, Ni—Cd and Ni-MH batteries or the like. Particularly, when it is charged or discharged under high temperature, its life is shortened, and susceptible to overvoltage and therefore application of an excessive overvoltage to the lithium cell in charging involves risks of smoking and ignition.

Hereinafter is described a mechanism by which the lithium-cell 1 leads to the smoking and the ignition in the application of the excessive charging voltage with reference to FIG. 9 illustrating a state of the lithium-cell 1 in relation to temperature.

First, when overvoltage is applied, degradation of the electrolyte inside a battery accelerates and then heat is generated and temperature in the battery starts to rise. At the same time, evaporating gases (diethyl carbonate and ethylene carbonate gases) of the electrolyte are generated inside the battery to cause expansion of the aluminum laminates 6. On this occasion, some quantities of the evaporating gases are discharged out of an explosion-proof valve. A separator 4 of the present battery has a double structure and its material is formed from PE (polyethylene) and PP (polypropylene). When an internal temperature of the battery has risen to reach about 120 deg C., the separator 4 thereinside begins to shrink. When the temperature has risen further, a PE separator making up one part of the separator 4 begins to be dissolved at about 135 deg C. Then, a PP separator making up the other part of the separator 4 begins to be dissolved at 165 deg C. At this dissolution of the PP separator, an internal dielectric breakdown of the lithium cell 1 progresses. Further, seals of the aluminum laminates 6, 6 are broken to thereby start a discharge of the internal gases. Thence, the temperature rise progresses rapidly to cause a thermal decomposition of the electrolyte at 250 deg C., and then gases such as $CH_4$, $C_2H_4$, $C_2H_6$ are generated to break the insulation performance of the separator 4. In due course of time, when internal short-circuiting has begun, a sparking phenomenon acts to satisfy an ignition point, thus ending up the ignition.

As described above, the lithium-ion battery 1 stands up poorly to an overvoltage due to the same utilizing lithium ions and therefore it has been recognized that the application of the overvoltage will lead to the smoking and the ignition if the worst comes to the worst. It has been, however, left unexplained how the input energy (charging power) including impressed voltages and currents is exactly related to the smoking and ignition of the laminate-type lithium-ion battery, and therefore a situation where no fundamental measure is available against the hazard has continued. As an interim measure to solve the safety hazard, a protection circuit for preventing the smoking and ignition of the battery (e.g., refer to Japanese unexamined patent application publication No. 8-222278 and Japanese patent No. 2861879) is normally installed inside a battery charger and a battery pack. In Japanese unexamined patent application publication No. 11-222278, the smoking and ignition of the battery are prevented by prohibiting charging to a secondary battery when a flammable gas or the like is detected.

Further, Japanese patent No. 2995142 discloses a battery charger in which when each battery cell is monitored with respect to its charged voltage and then any battery cells have reached an upper limit of the charged voltage, the battery cells having reached the upper limit are bypassed to continue to pass charging currents to the other batteries to allow all battery cells to be fully charged.

FIG. 10 is a block diagram representing an outline configuration of the lithium cell 1 that is mounted on an electronics device or the like. In the drawing, the lithium cell 1 is configured as a battery pack 10 having a protection circuit 11 incorporated therein. The protection circuit 11 is equipped with, e.g., a current fuse, a temperature fuse and an overvoltage protector to thereby shut off the charging power supplied to the lithium cell 1, thus protecting the lithium cell 1 at the time of overcurrent, overvoltage and abnormal temperature. A battery charger 12 for inputting a charging power to the lithium cell 1 to charge the same is connected with a previous stage to the battery pack 10. The battery charger 12 comprises a stabilized power supply 13 for producing a stabilized electric power and a charging circuit 14 for supplying the charging power to the battery pack 10 using the stabilized electric power 14, thus charging the lithium cell 1.

FIG. 11 is a block diagram representing an outline configuration when the protection circuit is mounted on the lithium battery 1. In the figure, the battery charger 12 for inputting the charging power to the lithium-ion battery 1 to charge the same is connected with the lithium-ion battery 1. The battery charger 12 comprises a constant-voltage and constant-current circuit for stabilizing a charging voltage or a charging current to charge the lithium-ion battery 1 linearly, a pulse charging circuit for supplying a pulse-shaped charging current to pulse-charge the lithium-ion battery 1, or the like to allow these circuits to be arbitrarily selected according to battery performance and its life span.

Specifically, the protection circuit, as shown in FIG. 12, may comprise a comparator 15, an OR circuit 16 and a temperature sensor 17 and monitors a voltage of the charging power output to the lithium-ion battery 1 and a temperature rise of the lithium-ion battery 1 to shut down the battery charger 12 in overvoltage and excessive charging, thus protecting the lithium-ion battery 1. A noninverting control input terminal of the comparator 15 is connected with a connecting line with the battery charger 12 and the lithium-ion battery 1 for the sake of inputting a monitoring target voltage of the charging power. At the same time, a given reference voltage Vref output from a reference electric power source 18 is input to an inverting control input terminal of the comparator 15. When having detected an overvoltage exceeding the reference voltage Vref at the time of an abnormal output or the like of the battery charger 12, the comparator 15 outputs an overvoltage signal S1 from its output terminal. Further, a temperature sensor 17 attached to the lithium-ion battery 1 detects malfunction in excessive charging from the temperature rise of the lithium-ion battery 1 to output an excessive charging signal S2. Further, the overvoltage signal S1 and the excessive charging signal S2 are input to the OR circuit 16 and either the overvoltage signal S1 or the excessive charging signal S2 is output to thereby output a malfunction signal S3 from the OR circuit 16 to the battery charger 12. As a result, when having received the malfunction signal S3, the battery charger 12 shuts off the charging power supplied to the lithium-ion battery 1.

When the protection circuit 11, shown in FIG. 10, fails to operate properly from any cause, however, risks of smoking and ignition cannot be avoided. Hence, the wide use of the lithium-ion battery in fields where high reliability is required, such as in the fields of an electric power source and uninterruptible power supply unit, has lagged behind.

Under the existing situation, it has still been left unexplained how far the process in the above-mentioned smoking and ignition mechanism progresses in response to input energy (voltage and current stresses) such as overvoltage, excessive charging or the like. As a result, both battery makers and device makers using batteries cannot help relying upon the protection circuit against the smoking and ignition. In reality, the protection circuit for monitoring and controlling the battery, however, becomes inoperative in protection performance, if its monitors (a voltage monitor, a current monitor and a temperature monitor) are out of order, or its controller (its control circuit) for receiving signals from the monitors to control the signals received is out of order, or further protection elements (a shut-off switch, a fuse, semiconductor switches such as FFTs, bipolar transistors or the like) for receiving signals from the controller to operate fails to operate properly as a protection circuit. That is, if the worst comes to the worst, there is a possibility of inducing the smoking and the ignition.

Further, the conventional protection device for a secondary battery shown in FIG. 11 does not detect the malfunction until abnormality such as excessive charging or the like has occurred and hence a protecting operation for the battery charger 12 has been often took too late. Accordingly, in the event that the temperature rise of the lithium-ion battery 1 progresses rapidly, there has been a possibility to cause the smoking and the ignition.

Additionally, a temperature sensor 17 needs to be attached to the lithium-ion battery 1, having raised a problem that the excessive charging cannot be detected from information only from the battery charger 10 side. Particularly, in the lithium-ion battery 1 mounted on an inside of a portable device, connection terminals for temperature information must be provided other than connection terminals for charging, in order to connect the temperature sensor 17 attached to the lithium-ion battery 1 electrically with the battery charger 10.

Incidentally, in the case of excessive discharging, a secondary battery such as the lithium-ion battery 1 is liable to generate abnormal heat to be broken due to internal short-circuiting if the worst comes to the worst as well as remarkable shortening in life span. Hence, the lithium-ion battery 1 needs to be protected in discharging in the same way as in charging. In Japanese patent No. 2861879, e.g., a secondary battery pack equipped with both excessive discharging protection circuit and excessive charging protection circuit is disclosed.

Further, in the conventional battery charger containing the battery charger disclosed in Japanese patent No. 2995142 and the conventional electric power unit including this sort of the battery charger, charging and discharging control has been practiced based on a battery cell terminal voltage that is information from a detection means or the like or on an output voltage or output current of a charging circuit. Besides, such control has been performed that when the charging circuit is out of order, a protection circuit is allowed to operate. Accordingly, it has been seen as the problem that when functions of the detection means and protection circuit has gone down, the charging and discharging control for the lithium-ion battery fails to operate properly, resulting in lowered performance, life span or the like of the lithium-ion battery. Moreover, it has been seen as the problem, too, that in the worst-case scenario such as a series of chance failures (so-called "if the worst comes to the worst") occurs, there has been a risk of leading to the smoking and the ignition.

Besides, the lithium-ion battery 1 is charged by applying typically 4.1 V or 4.2V/cell thereto. Accordingly, when charging a lithium-ion battery comprising a plurality of series-connected battery cells, a voltage of a charging voltage/cell multiplied by the number of series-connection is applied to the whole of the lithium-ion battery.

On one hand, at the time of controlling the charging of the lithium-ion battery 1 without interruption under high temperature, a separator for separating positive-and negative-terminals is liable to expand to be holed therein, thus allowing lithium attached to the positive-terminal and metallized to pass through the separator to reach a positive-terminal side, leading to the likelihood to short-circuit the positive and negative-terminals. In the worst case scenario, all other cells can be short-circuited with only one cell remaining non-short-circuited among multiple-cells-series-connected lithium-ion batteries. In the possible worst case scenario like this, the problem has also arisen that a voltage for charging all the battery cells is applied to the one cell only to lead to a high likelihood of causing smoking and ignition.

On the other hand, for a maker side, reflecting the worst case leading to the smoking and ignition, it is general to strengthen a protection circuit function so as to practice a fail-safe design for securing safety even if a function of the protection circuit has been lost. It could not be denied, however, that there are such high risks involved that if a series of chance failures have occurred, due to charging action being performed with a fail-safe function remaining inoperative, the lithium-ion battery rises in temperature to be led to the smoking and the ignition.

As an alternative measure, it might be possible to aim at a perfect safety measure against the worst scenario, which, however, inevitably leads to a sharp cost increase in equipment, making such measure poor in feasibility.

SUMMARY OF INVENTION

With the view toward the solution of the problems described above, it is an object of the present invention to provide a method and device for safety protection of a secondary battery which are capable of preventing the smoking and ignition of the secondary battery.

Further, it is another object of the present invention to provide a method and device for safety protection of a secondary battery of which the manufacturing cost increase can be controlled, while enabling the smoking and ignition of the secondary battery to be prevented reliably even if a series of chance failures have occurred.

To achieve the above objects, a method for safety protection of a secondary battery according to the present invention includes limiting a charging power to a lower value than a given value, and inputting the charging power thus limited to the secondary battery.

Further, a device for safety protection of a secondary battery according to the present invention is equipped with an input terminal connected with a side of a charging electric source for supplying a charging power to the secondary battery, an output terminal connected with a side of the secondary battery and an electric power limiting means for limiting the charging power input to the input terminal to a lower value than a given value, and outputting the charging power thus limited to the output terminal.

In both of the above-described cases, the given value is desirably an electric power value up to which separators inside cells of the secondary battery doesn't rise to its dissolution temperature.

The present invention has been achieved by taking notice of the fact that a process leading to the smoking and ignition of a secondary battery progresses depending on a charging power input to the secondary battery. Accordingly, this charging power is limited to within a safe operation region for using the secondary battery safely, thereby permitting the secondary battery to operate safely under any conditions.

Specifically, the device for safety protection of the secondary battery according to the present invention is equipped with an electric power detector for detecting charging and discharging power of a secondary battery, a charging and discharging amount deriving unit for time-accumulating the charging and discharging power to determine an energy amount, and a protecting operation unit for stopping charging and discharging of the secondary battery when the energy amount has reached a given value.

Accordingly, since the energy amount in charging and discharging is determined by time-accumulating the charging power or the discharging power, a more precise and more stable detection than a temperature detection becomes possible and besides more rapid protection operation than a temperature detection also becomes possible. Further, a protection operation becomes possible both in charging and in discharging only by monitoring the energy amount determined by the detection of the charging power or discharging power. Hence, safe charging and safe discharging control of the secondary battery becomes easily possible, thus being capable of building up a simplified circuitry which dispenses with a temperature detection circuit conventionally used at heat generation of the secondary battery and an overvoltage detection circuit.

Furthermore, the method for safety protection of a secondary battery according to the present invention includes limiting at all times a charging current into a lithium-ion battery to a given current value or less.

Accordingly, since the lithium-ion battery is charged at all times with a current equal to or less than the given current value, no temperature rise attributable to smoking and ignition of the lithium-ion battery occurs to thereby reliably prevent the smoking and ignition of the lithium-ion battery when a series of chance failures have occurred.

Moreover, in the method for safety protection of a secondary battery according to the foregoing aspect of the present invention, the given current value may be substantially equal to 0.11 CA for 5 hour-rate nominal capacity (CA means capacity).

A method for safety protection of a secondary battery according to another aspect of the present invention is such that, when a temperature at which impedance of the secondary battery makes the transition from an approximately constant state to a descending state is defined as an impedance descending temperature, said given current value is set as a value at which said secondary battery doesn't reach temperatures equal to or more than said impedance descending temperature when a current based on said given current value is supplied to said secondary battery.

According to the present invention, by limiting the charging power input to the secondary battery, the smoking and ignition of the secondary battery can be prevented, thus providing a safe secondary battery pack free from the risk of smoking and ignition.

Further, the smoking and ignition of the secondary battery can be prevented by using information only on the charging and discharging power.

Further, since the charging current input to the lithium-ion battery is limited at all times to the current value equal to or less than the given current value, the smoking and ignition of the lithium-ion battery can be reliably prevented even if a series of chance failures have occurred.

BRIEF DESCRIPTION OF THE DRAWING

The invention will be more readily understood by reference to the following description, taken with the accompanying drawings, in which.

DESCRIPTION OF THE PREFERRED EMBODIMENTS

The following is a detailed description of preferred embodiments according to the present invention with reference to the appended drawings.

Embodiment 1

The invention in an embodiment 1 is realized by figuring out a mechanism in which a secondary battery such as, e.g., a lithium-ion battery or the like leads to giving rise to smoking and ignition and by discovering that an region of safe operation of the secondary battery, not giving rise to the smoking and the ignition, was determined not by a total energy amount (a charging power amount) that had been input to the secondary battery but by input energy (charging power Pc) that is an energy amount input per hour to the secondary battery and thereby the secondary battery is allowed to be safely used by controlling the input energy. Hitherto, the region of safe operation is unclear and hence the input energy input to the secondary battery depended on a battery charger. Therefore, some types of the battery charger were at risk for inputting the input energy larger than that of the region of safe operation to a battery pack. Since safety in the battery pack is secured only by the protection circuit, and therefore it was difficult to secure the safety perfectly by the battery pack itself. Consequently, in order to secure the safety independently inside the battery pack in any conditions such as a case where e.g., the protection circuit has been broken down and further in order to make a secondary battery operate in the region of safe operation, the present invention controls the input energy without depending on energy supplied from the battery charger by defining the region of safe operation in accordance with a law between the input energy leading to the basic cause of the smoking and ignition, secondary battery temperature and allowable energy.

Hereunder is a description of a preferred embodiment in a method and device for safety protection of secondary battery in an embodiment 1 with reference to the appended drawings. In addition, the same reference numbers are labeled for parts the same as in the conventional example and descriptions of common parts are omitted to avoid overlap.

Figure 1:
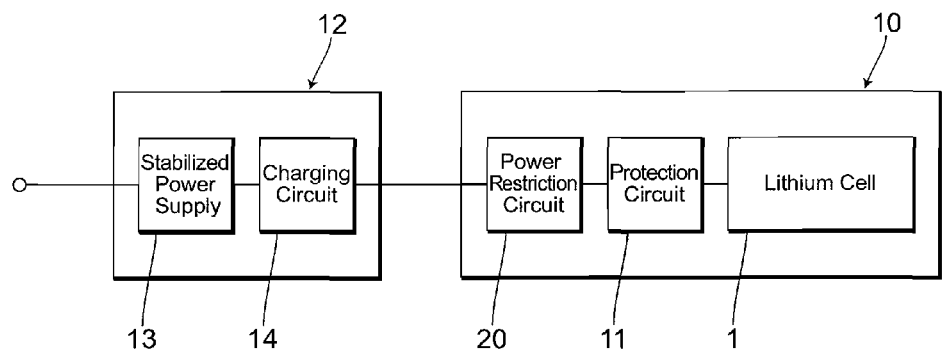
FIG. 1 is a block diagram illustrating a method for safety protection of a secondary battery and a configuration of a secondary battery pack incorporated with a safety protection device in a first embodiment of the present invention.
Figure 2:
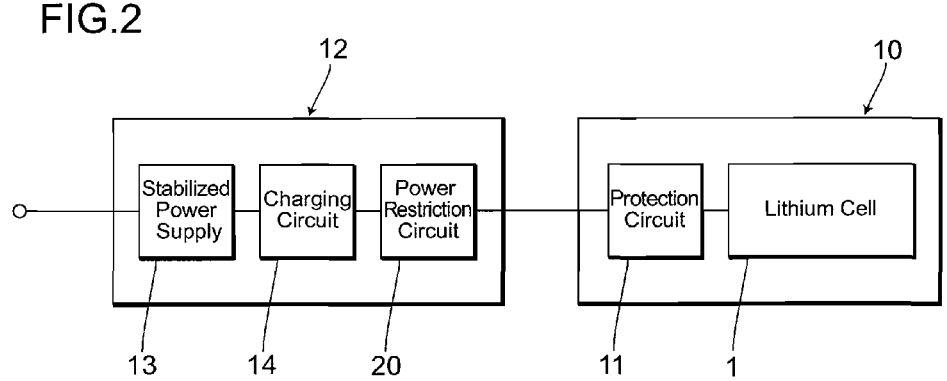
FIG. 2 is a block diagram illustrating a different configuration of the secondary battery pack in the same.

FIG. 1 is a block diagram representing an outline configuration in the case of mounting a battery pack 10, in which an electric power restriction circuit 20 realizing a method and device for safety protection of secondary battery in the present invention is incorporated, on an electronic device or the like. In the figure, a battery pack 10 is incorporated with a chargeable and dischargeable lithium cell 1, a protection circuit 11 for cutting off charging power Pc supplied to the lithium cell 1 at the time of overcurrent, overvoltage and an abnormal temperature, the electric power restriction circuit 20 described later or the like. The configurations of the lithium cell 1 and protection circuit 11 are identical to those shown in the conventional example. A battery charger 12 for charging the lithium cell 1 by inputting electric power Pc thereto is connected with a previous stage of the battery pack 10. The battery charger 12 comprises, as is shown in the conventional example, a stabilized power supply 13 for producing stabilized electric power and a charging circuit 14 for supplying the electric power Pc to the battery pack 10 using the stabilized electric power to charge the lithium cell 1. The charging circuit 14 in the present embodiment employs a constant-voltage and constant-current circuit by which it becomes easy to calculate a charging power amount, whereas a pulse charging circuit or the like may be employed. As shown in FIG. 2, the electric power restriction circuit 20 may be incorporated in the battery charger 12 and in this case, even if the battery pack 10 is replaced due to the end of the life of the lithium cell 1, new charging can be performed invariably within the region of safe operation.

Figure 3:
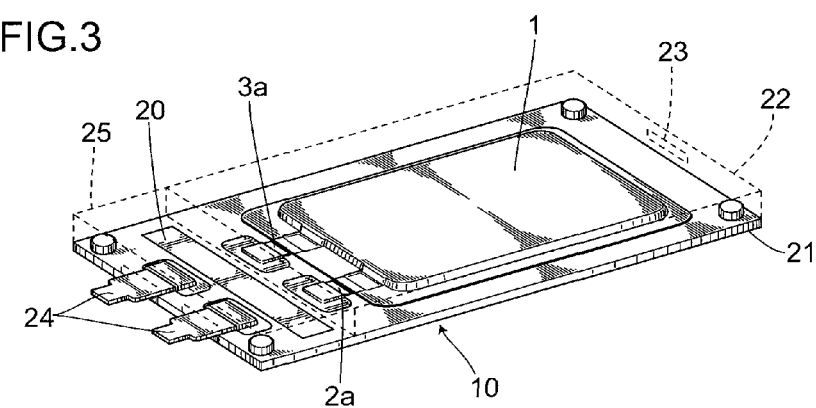
FIG. 3 is a perspective view of a single cell pack that is the secondary battery pack in the same.

FIG. 3 is a perspective view representing an external appearance of the battery pack 10. The lithium cell 1 comprises the electric power restriction circuit 20 components laid on an aluminum circuit board 21. The aluminum board 21 may be any board as long as is an excellently-exoergic mounting board and so may be a board produced by combining a metallic plate and a printed-circuit board. In a front portion of the aluminum board 21, the electric power restriction circuit 20 is collectively mounted, while the lithium cell 1 is laid on a no component-mounted portion (a portion where no surface-mounted component is mounted) extending from a central part to a rear portion of the aluminum board 21. Further, the protection circuit 11 is mounted on such an appropriate position on the aluminum board 21 as, e.g., the periphery or the like of the electric power restriction circuit 20. A positive-terminal 2a and negative-terminal 3a of the lithium cell 1 are connected and fixed electrically to the aluminum board 21 by means of e.g., soldering or the like in order to connect electrically to the electric power restriction circuit 20. Due to excellently exoergic performance, the aluminum board 21 acts as a radiator for excellently radiating heat generated by the lithium cell 1 to thereby allow an region of safe operation of the lithium cell 1 described later to be enlarged. Faston terminals 24, 24 provided in a protruding manner from the aluminum board 21 is connecting terminals used for electrical connection with the battery charger 12 not shown to be electrically connected to and fixed to the aluminum board 21 by means of, e.g., soldering or the like. In other words, the faston terminals 24, 24 are connected electrically with the positive-terminal 2*a* and negative-terminal 3*a* via the electric power restriction circuit 20. Of course, the connection with the battery charger 12 may be practiced by using connectors or the like.

An upper portion of the aluminum board 21 that is a lithium cell 1 mounted surface side is covered with a front iron cover 25 and a rear iron cover 22, which are mounted on the aluminum board 21 so as to cover parts of the electric power restriction circuit 20 and faston terminals 24, 24, respectively. Thus, the upper portion of the aluminum board 21 is covered separately with the front iron cover 25 and the rear iron cover 22 and thereby the electric power restriction circuit 20 and the lithium cell 1 are separated, so that even if a gas is discharged from the lithium cell 1 at the time of a thermal hazard, no influence is effected on the electric power restriction circuit 20, thus permitting ignition initiated from the electric power restriction circuit 20 or the like to be also prevented. On a rear surface (a surface at a side opposed to a side of the positive-terminal 2*a* and negative-terminal 3*a*) of the rear iron cover 22, a hole 23 for an explosion-proof valve is formed for exhausting the gas outside the battery pack 10 when the gas has been discharged form the explosion-proof valve (not shown) of the lithium cell 1

Figure 4:
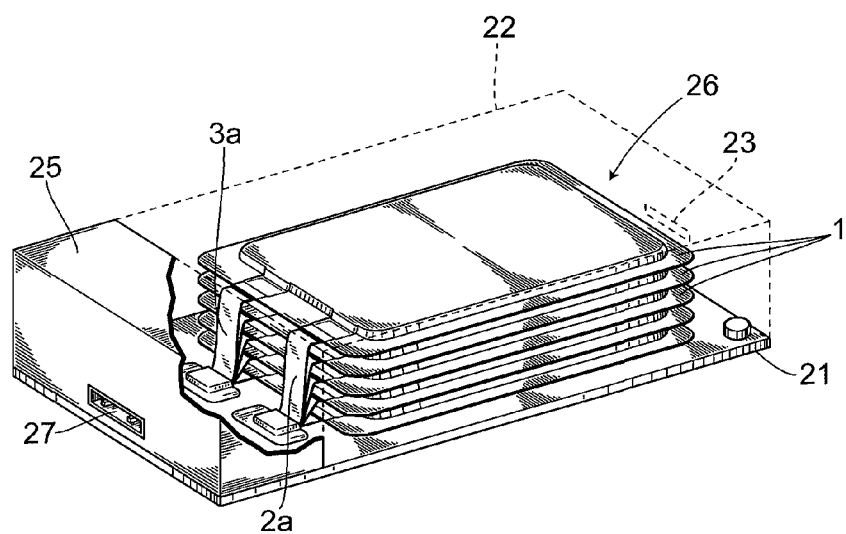
FIG. 4 is a perspective view of a grouped cell pack that is the secondary battery pack in the same.
Figure 5:
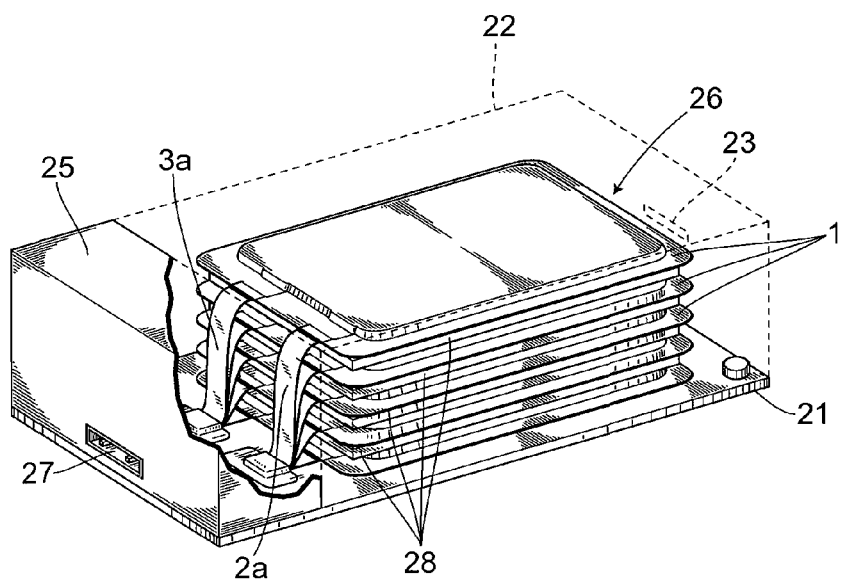
FIG. 5 is a perspective illustrating a modified example of the grouped cell pack that is the secondary battery pack in the same.

The battery pack 10 shown in FIG. 3 is built up by a single cell pack equipped with a single lithium cell 1, while the battery pack 10 may be build up by a group of the cell packs in which a plurality of the lithium cells 1 are stacked and is connected to one another as shown in FIG. 4. At this time, safety can be secured independently by lithium cell 1 itself by providing the electric power restriction circuit 20 in the single cell and hence by combining these single cells, a group of the cell packs of a safe and various lithium-ion battery can be provided. In the figure, an input connector 27 is provided instead of the faston terminals 24, 24 to connect the battery charger 12 and the group of the cell packs. Besides, as a modified example of the group of the cell packs, as shown in FIG. 5, the group of the cell pack is encountered in which excellently exoergic members 28 such as aluminum plate or the like are inserted between each lithium cell. The battery stack 26 has a structure of vertically stacked lithium cells 1 and hence is prone to be accumulated with heat in its central portion, so that the lithium cells 1 positioned in the central portion are likely to become high in temperature. By providing the excellently exoergic members 28 excellent between each lithium cell 1, heat generated in each lithium cell 1 is rapidly radiated, so that heat accumulates in no central portion of the battery stack, thus permitting the region of safe operation to be extended.

Next is a detailed description of the electric power restriction circuit 20 providing the feature of the present invention.

First, the region of safe operation, acting as a precondition, is defined for the lithium cell 1 comprising a laminate type lithium-ion battery. The region of safe operation means a parameter for determining a charging condition leading to no smoking and ignition and is determined not by an input energy amount to a secondary battery but by permissible energy of the secondary battery. Prior to calculating the permissible energy of the lithium-ion battery, the input energy amount E (an electric power amount) input to the lithium-ion battery can be calculated by the following formula.

$$E = \int Vc(t)*I(t)*\Delta T \approx \text{(nearly equals)} KVc*I(t)*\tau \quad (1)$$

where Vc(t), I(t) denote time functions of a charging voltage and charging current and Vc(t) becomes a given constant voltage Vc at a full charged state of the lithium cell 1. $\tau$ denotes an input energy continuing period of time. K denotes a constant number holding a steady value but different in value depending on a waveform applied and so becomes 1.0 in the case of a constant value of DC. In an electric power derating, when a dissolution temperature of a separator inside the cells is an absolute maximum rating temperature Tmax, an absolute maximum rating loss is Pmax at this time and an ambient temperature is Ta, $(Tmax-Ta)/Pmax=\theta_{j-a}$ is established. Besides, when a battery cell surface temperature at this time is set as Tc, the formula $\theta_{j-a}=\theta_{c-a}+\theta_{j-c}$ is obtained, where $\theta_{j-a}$ denotes thermal resistance between the central portion of the cell and the ambient temperature, $\theta_{c-a}$ denotes thermal resistance between the cell surface temperature and the ambient temperature, and $\theta_{j-c}$ denotes thermal resistance between the central portion of the cell and the cell surface temperature. Accordingly, $Pmax=(Tmax-Ta)/(\theta_{c-a}+\theta_{j-c})$ is obtained. $\theta_{j-c}$ is determined by an inside structure and form of a battery, while $\theta_{c-a}$ is determined by a radiation structure of the battery cell. At this time, the energy amount per unit time of the input energy amount E calculated by the formula (1) should be set within the absolute maximum rating loss Pmax that is permissible energy of the cell. Namely, this can be expressed by $$\text{Charging power } Pc = E/T \approx (KVc*I(t)*\tau) = KVc*I(t) < Pmax \quad (2)$$

and thereby the region of safe operation can be set. The charging power Pc described here represents a value resulting from time-averaging power input to the secondary battery. By using an approximate expression of the input energy amount E, it can be judged, from a product of an instantaneous value Vc*I(t) of the charging power Pc and constant number K, whether a charging state of the secondary battery is within the region of safe operation or not.

Figure 6:
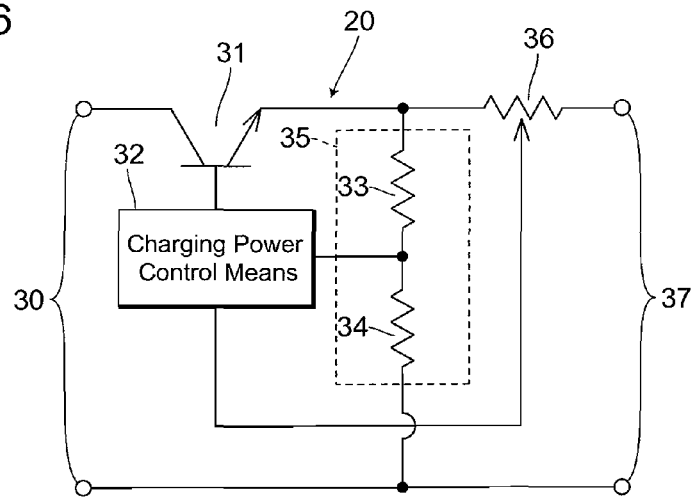
FIG. 6 is a circuit diagram illustrating a configuration of the safety protection device of the secondary battery pack in the same.

FIG. 6 represents a configuration of the electric power restriction circuit 20. The electric power restriction circuit 20 comprises a pair of input terminals 30, 30 connected with the battery charger 12 side, a pair of output terminals 37, 37 connected with the lithium cell 1 side, a switching element 31 which is connected between the input terminal 30 and the output terminal 37 and comprises, e.g., a transistor or the like for turning on and off a power circuit of the charging power Pc input from the battery charger 12 to the lithium cell 1, a charging power control means 32 comprising, e.g., a micro computer or the like for controlling a switching operation of the switching element 31, a voltage detection means 35 comprising resisters 33, 34, and a current detection means 36 comprising, e.g., a shunt resister, a current transformer or the like.

The charging power control means 32 determines the absolute maximum rating loss Pmax by using the absolute maximum rating temperature Tmax, the thermal resistance $\theta_{j-a}$ between the central portion of the cell and the ambient temperature, and the ambient temperature Ta measured by, e.g., a temperature sensor or the like. Additionally, the ambient temperature Ta is set as an appropriate value without using an actually measured value. When the charging power Pc has been supplied from the battery charger 12 to the input terminals 30, 30, the voltage detection means 35 inputs a voltage value produced by dividing a voltage of the charging power Pc by the resisters 33, 34 to the charging power control means 32 and at the same time the current detection means 36 inputs a current value of the charging power Pc to the charging power control means 32, which calculates the charging power Pc from the voltage value and the current value that have been input from the voltage detection means 35 and the current detection means 36. At this time, since the charging power is Pc≈KVc*I(t), the voltage value and the current value that have been input from the voltage detection means 35 and the current detection means 36 may be sampled by a proper cycle to calculate the instantaneous value of the charging power Pc. As a matter of course, e.g., a voltage value and a current value from the start of charging to the present are sampled every second and then by defining the number of sampling times as a input energy continued time τ, an integrated value of the charging power Pc every second, that results the input energy E, is determined. Then, the input energy amount E may be divided by the input energy continued timerto thereby calculate the charging power Pc averaged. The charging power control means 32 monitors the calculated value of the charging power Pc to set limits to electric power so as to restrict, by switching accordingly the switching element 31, the calculated value of the charging power Pc within the absolute maximum rating loss Pmax that is the boundary value of the region of safe operation. In other words, the charging power Pc input from the output terminals 37, 37 to the lithium cell 1 is limited within the boundary value Pmax of the region of safe operation where the lithium cell 1 can be safely used to thereby permit the lithium cell 1 to operate safely in any conditions. Consequently, the smoking and ignition of the lithium cell 1 can be prevented to permit a safe battery pack 10 without the smoking and the ignition to be provided.

Figure 7:
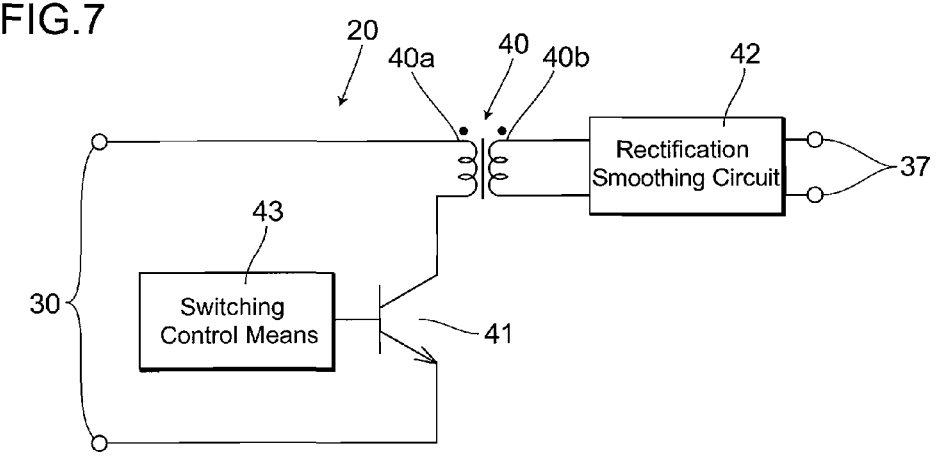
FIG. 7 is a circuit diagram where the safety protection device of the secondary battery pack is constituted by a DC/DC converter in the same.
Figure 8:
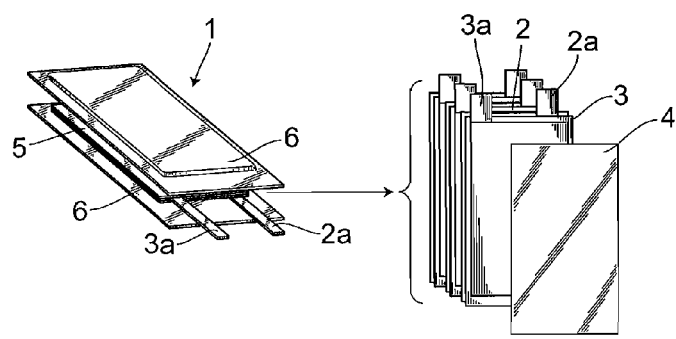
FIG. 8 is an exploded perspective view illustrating an internal structure of a laminate type lithium-ion battery.
Figure 9:
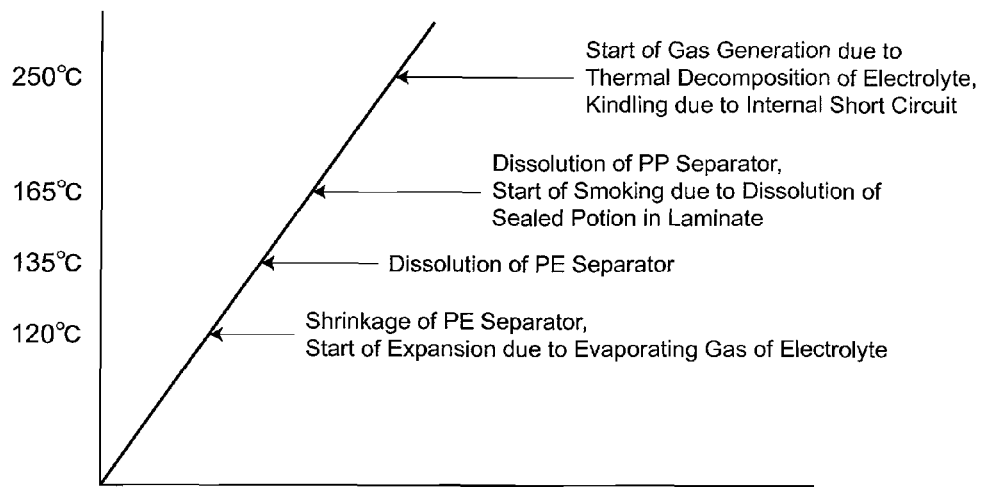
FIG. 9 is an explanatory diagram illustrating a mechanism where smoking and ignition of the laminate type lithium-ion battery is caused.
Figure 10:
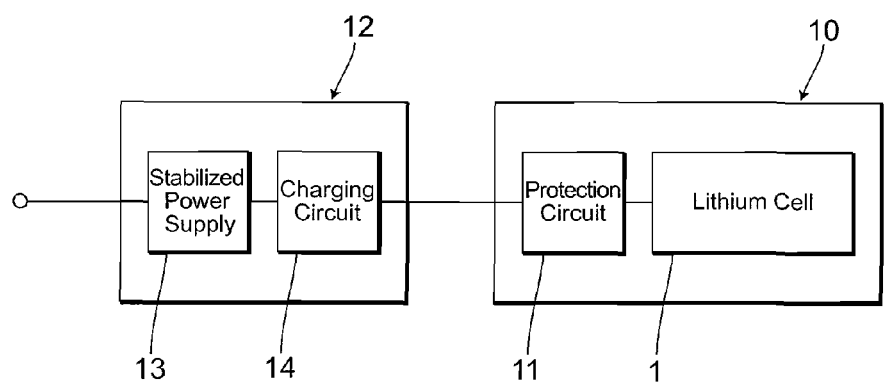
FIG. 10 is a block diagram illustrating a configuration of the secondary pack in the conventional example.

The electric power restriction circuit 20 may be made up by a power converter such as, e.g., a DC/DC converter or the like. FIG. 7 represents an example of an electric power restriction circuit 20 made up by the DC/DC converter. In the figure, the electric power restriction circuit 20 comprises a pair of input terminals 30, 30 connected with the battery charger 12 side, a pair of output terminals 37, 37 connected with the lithium cell 1 side, a transformer 40 with a primary winding 40a and a secondary winding 40b, a switching element 41 comprising, e.g., a transistor or the like, a switching control means 43 comprising, e.g., a micro computer controlling a switching operation of the switching element 41, and a rectification smoothing circuit 42. A series-connected circuit comprising a primary winding 40a and a switching element 41 is connected between the input terminals 30, 30. The secondary winding 40b is connected with the output terminals 37, 37. In the electric power restriction circuit 20, the charging power Pc input from the battery charger 12 to the input terminals 30, 30 is supplied intermittently to the primary winding 40a by the switching operation of the switching element 41 and then induced electric power of the secondary winding 40b is rectified and smoothed by the rectification smoothing circuit 42 to be output from the output terminals 37, 37 to the lithium cell 1. At this time, based on the absolute maximum rating loss Pmax preliminarily calculated, the switching control means 43 monitors the induced electric power (the charging power Pc after having been converted to electric power) detected by a charging power detection circuit not shown. Then, by controlling accordingly the switching operation of the switching element 41 using the well-known PWM control or the like, the charging power control means 32 limits the electric power so that the induced electric power fall within the absolute maximum rating loss Pmax acting as the boundary of the region of safe operation. In this case, since the transformer 40 is used in the electric power restriction circuit 20, the primary and secondary sides are insulated and hence even if malfunction has been developed in the lithium cell 1 located at the secondary side, the malfunction has preferably no impact on the primary side.

As described above, the electric power restriction circuit 20 in the present embodiment limits the charging power Pc to a value lower than the boundary value Pmax of the region of safe operation that is a given value to input the charging power Pc limited to the lithium cell 1 acting as a secondary battery. Further, the electric power restriction circuit 20 is equipped with the input terminals 30 connected with the side of the battery charger 12 acting as a charging electric source for supplying the charging power Pc to the lithium cell 1, the output terminals 37 connected with a side of the lithium cell 1, a switching element 31 for limiting the charging power Pc input to the input terminals 30 to the value lower than the boundary value Pmax of the region of safe operation to output the charging power Pc thus limited to the output terminals 37, thereby acting as an electric power limiting means, and the charging power control means 32 (the switching element 41, the switching control means 43).

The present embodiment is realized by taking into account the fact that the process leading to the smoking and ignition of the lithium cell 1 progresses depending on the charging power P input to the lithium cell 1. So, by limiting the charging power Pc so as to fall within the boundary value Pmax of the region of safe operation for using the lithium cell 1 safely, the lithium cell 1 can be safely operated under any conditions. Consequently, by limiting the energy input to the lithium cell 1, the smoking and ignition of the lithium cell 1 becomes possible to be prevented, thus permitting a safety battery pack 10 without the smoking and the ignition to be provided.

Embodiment 2

Next is a detailed description of a second embodiment with reference to the appended drawings. In addition, the same reference numerals are used for parts the same as in the conventional example and descriptions of common parts are omitted to avoid overlap as much as possible.

Figure 11:
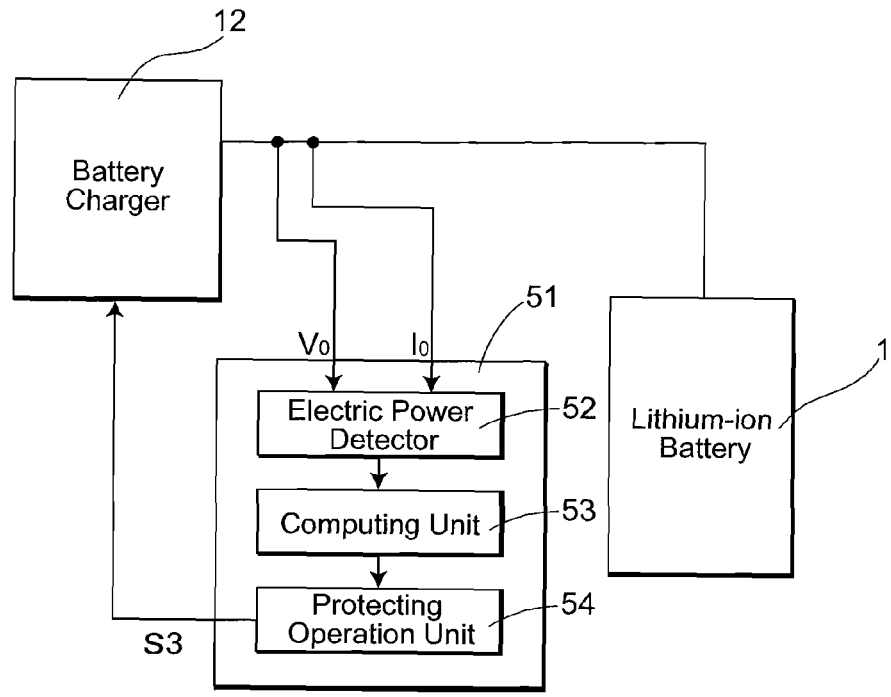
FIG. 11 is a block diagram illustrating a configuration of a device for safety protection of a secondary battery in a second embodiment of the present invention.
Figure 12:
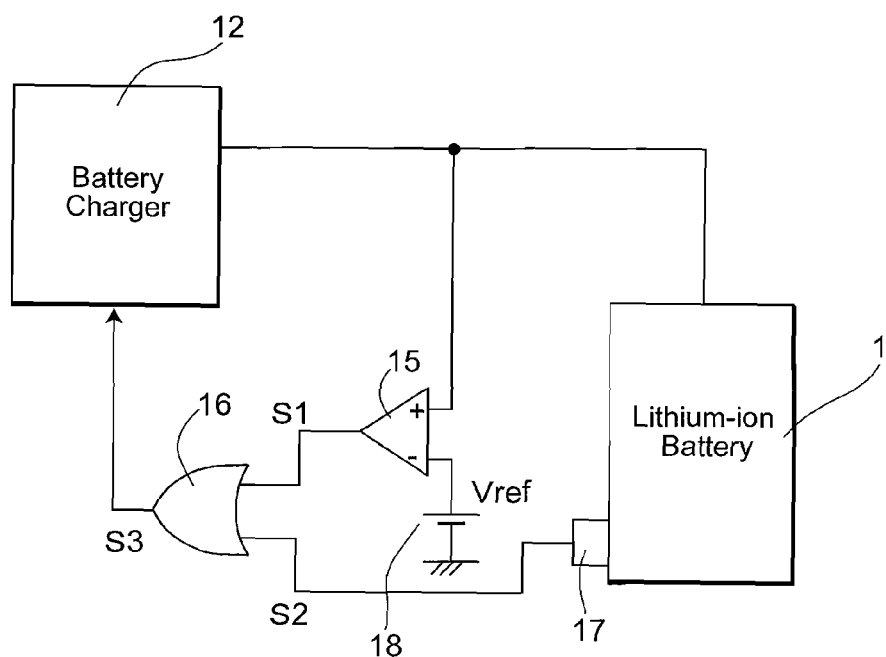
FIG. 12 is a block diagram illustrating a configuration of the secondary pack safety protection device in the conventional example.

FIG. 11 is a block diagram representing an outline configuration in the case of mounting a device for safety protection of a secondary battery in the present embodiment on a lithium-ion battery 1. In the figure, as is the case with the conventional example, a battery charger 12 for inputting charging power to the lithium-ion battery 1 to charge the same is connected with the lithium-ion battery 1. Reference numeral 51 denotes a CPU corresponding to the safety protection device, e.g., a micro computer or the like, an electric power detector 52 with an input port connected to a connection line between the battery charger 12 and the lithium-ion battery 1, a computing unit 53 acting as a charging and discharging amount deriving unit capable of performing various arithmetic processes, and a protecting operation unit 54 with an output port connected with the battery charger 12. The electric power detector 52 detects an output voltage Vo and an output current Io which represent the charging power of the battery charger 12 to input both the output voltage Vo and the output current Io to the computing unit 53. The computing unit 53 determines an energy amount (an electric power amount) actually input, at the time of charging, to the lithium-ion battery 1 from the output voltage Vo and the output current Io which have been detected by the electric power detector 52. When the energy amount has reached a safety limit, that is a preset specified energy amount, the protecting operation unit 54 outputs an abnormal signal S3 to the battery charger 12, thus causing the charging operation to the lithium-ion battery 1 to be shut down.

Next is a description of behavior of a CPU 51 in charging.

When charging power supply starts from the battery charger 12 to the lithium-ion battery 1, the electric power detector 52 of the CPU 51 takes in the output voltage Vo and output current Io of the battery charger 12 in increments of a given length of time Δt to input both the voltage Vo and the current Io to the computing unit 53. Using the output voltage Vo and the output current Io, the computing unit 53 determines the charging power (Vo*Io) of the lithium-ion battery 1 input from the battery charger 12 to the lithium-ion battery 1 to thereby determine the input energy amount by applying hour integration to the charging power. The integration described here means integrating the charging power during any period of time, In other words, that means performing the integration with the charging power defined as a function of time. As a specific procedure for determining the input energy amount, e.g., assuming that the charging power is constant during a period of time t to t+Δt, a sectional input energy amount (Vo·Io·Δt) input to the lithium-ion battery 1 during the period of time is continuously integrated in increments of Δt from the start of the charging, thus determining the input energy amount Σ(Vo·Io·Δt). Obviously, if the time function of time of the charging power is known, the input energy amount can be also determined by integrating the function of time. By monitoring the calculated value of the input energy amount and then if the calculated value has reached a predetermined safety limit value, the protecting operation unit 54 brings the battery charger 12 to a halt, thus protecting the lithium-ion battery 1 from overcharging.

Although the description with respect to charging has been given here, since output energy in discharging can be calculated as is the case with calculating the input energy in charging, this protection operation can be also applied easily to detection for preventing over discharging.

Specifically, in discharging of the lithium-ion battery 1, the electric power detector 52 of the CPU 51 takes in a discharging voltage and a discharging current in increments of a given length of time Δt and then an amount of the discharged energy output from the lithium-ion battery 1 is subjected to time integration to determine the amount of the discharged energy. At the same time, the protecting operation unit 54 monitors the calculated value of the discharged energy and when the calculated value has reached the safety limit value, shuts off the discharging by turning off, e.g., the switching element or the like in a discharging line of the lithium-ion battery 1, thus protecting the lithium-ion battery 1 from over discharging.

As just described, a protection operation in both charging and discharging can start before reaching the overcharging and the over discharging by monitoring the input energy amount or the discharged energy amount which are determined by detecting the charged and discharged power (the charging power or the discharging power). In other words, the CPU 51 can prevent the smoking and ignition of the lithium-ion battery 1 by using information only on the charged and discharged power such as the input energy amount or the output energy amount. The energy amounts are determined by time-integrating the charging power or the discharging power. Hence, more stable and more precise detection than done by temperature detection (easily fluctuant) susceptible to, e.g., the thermal conductivity of the lithium-ion battery 1 and ambient temperature is possible and also possible is more rapid protection operation than done by the temperature detection required for waiting for a temperature rise in malfunction. A safe charging control of the lithium-ion battery 1 becomes easily possible only by providing the CPU 51 in the battery charger 12. Hence, a simplified circuitry can be realized which needs no temperature sensor 17 corresponding to a temperature detection circuit that has been conventionally used in heat generation of the lithium-ion battery 1 and no comparator 15 corresponding to an overvoltage detecting circuit 17.

As described above, the CPU 51 in the present embodiment is equipped with the electric power detector 52 for detecting the charging and discharging power of the lithium-ion battery 1 acting as a secondary battery, a computing unit 53, acting as the charging and discharging amount deriving unit, for time-integrating the charging and discharging power to determine the energy amounts, and the protecting operation unit 54 for shutting off the charging and discharging of the lithium-ion battery 1 when the energy amounts have reached a given one.

As a result, since the energy amount in charging or discharging is determined by time-integrating the charging power or the discharging power, more precise and more stable detection than done by temperature detection becomes possible and besides more rapid protection operation becomes possible. Further, the protection operation both in charging and in discharging becomes possible only by monitoring the energy amount determined by detecting the charging and discharging power. Hence, safe charging and discharging control of the lithium-ion battery 1 becomes easily possible and thereby a simplified circuitry can be realized which needs no temperature sensor 17 corresponding to a temperature detection circuit that have been conventionally used in heat generation of the lithium-ion battery 1 and no comparator 51 corresponding to an overvoltage detection circuit 17. Hereby, a safety protection device can be provided by which smoking and ignition of the lithium-ion battery 1 can be prevented by using information only on charging and discharging.

In the meantime, the present embodiment can be altered without departing the scope of the gist of the present invention. The application of the present embodiment is applicable to various secondary batteries, electric power units equipped with secondary batteries, UPSs or the like. Further, the CPU 51 may be mounted on a battery charger 12 side or a lithium-ion battery 1 side and in this case the protection operation can be practiced independently by the battery charger 12 or the lithium-ion battery 1. Although the CPU 51 derives the input energy or the output energy by arithmetic processing, a well-known power meter may be employed instead of the CPU 51 to derive mechanically the input energy or the output energy, thus permitting the protection operation to be practiced.

Embodiment 3

Next is a detailed description of a third embodiment with reference to the appended drawings. In the meantime, the same reference numerals are used for parts the same as in the conventional example and descriptions of common parts are omitted to avoid overlap as much as possible.

First, before describing a charging method of a lithium-ion battery, a power supply unit incorporated with the lithium-ion battery is described as one example of the same. In addition, FIG. 13 is a block diagram representing a general configuration of a power supply unit (a UPS for AC) equipped with the lithium-ion battery.

Figure 13:
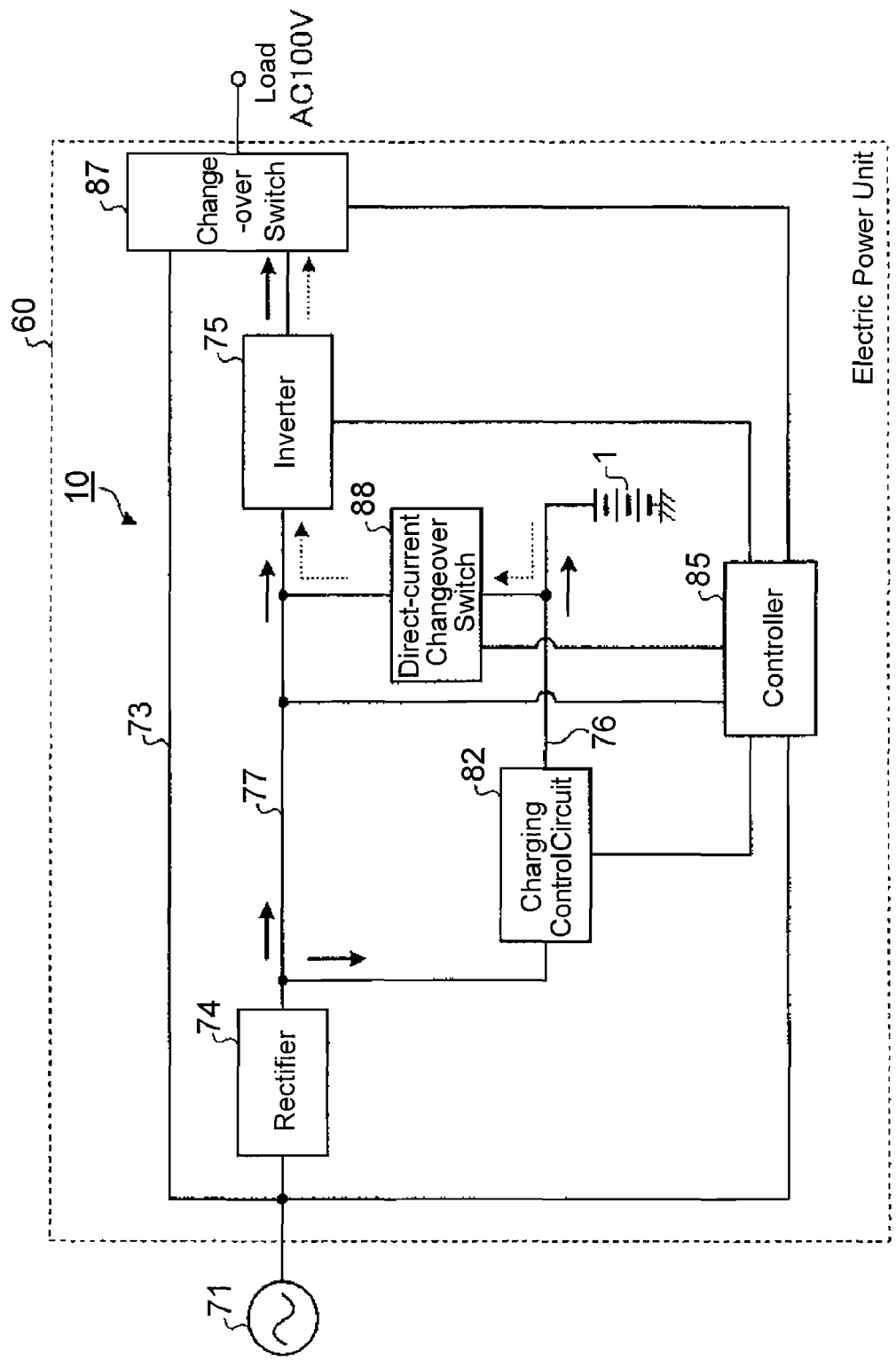
FIG. 13 is a block diagram illustrating a general configuration of an electric power unit (an alternating-current UPS) equipped with a lithium-ion battery in a third embodiment of the present invention.

The power supply unit 60 shown in FIG. 13 is equipped with each of constituents comprising a rectifier 74, an inverter 75, the lithium-ion battery 1, a charging control circuit 82 and a controller 85. An alternating-current output of the inverter 75 based on an alternating-current output of an alternating-current source 71 or a direct-current output of the lithium-ion battery 1 is supplied to a load by operations of these constituents, changeover switch 87 and/or direct-current changeover switch 88.

Next is a description of connections between each constituent making up the power supply unit 60. In FIG. 13, a bypass line 73 for supplying an alternating-current input from the alternating-current source 71 outputting, e.g., AC 100V directly to the load is provided between the alternating-current source 71 and one terminal of the changeover switch 87 for switching power feeding to the load. Further, in order to feed a stable alternating input to the load, differing from the bypass line 73, there is provided, between the alternating-current source 71 and the other terminal of the changeover switch 87, a series-connected constituent comprising the rectifier 74 acting as an AC/DC converter to convert the alternating input from the alternating-current source 71 to a direct-current output and the inverter 75 for converting the direct-current output from the lithium-ion battery 1 that is a backup electric source in power interruption to the alternating output. By this configuration, when a contact point of the changeover switch 87 is connected with one input terminal, the alternating-current input from the alternating-current source 71 is transmitted through the changeover switch 27 directly to the load. On the contrary, when a contact point of the changeover switch 27 is connected with the other input terminal, the direct-current output from the inverter 15 is transmitted through the changeover switch 27 to the load.

In FIG. 13, a charging control circuit 82 which acts as a device for charging the lithium-ion battery 1 and controls charging of the lithium-ion battery 1 based on the direct-current output from the rectifier 74 is connected between the alternating-current source 71 and the lithium-ion battery 1. Further, between a direct-current output line 77 leading from the rectifier 74 to the inverter 75 and a direct-current output line 76 leading from the charging control circuit 82 to the lithium-ion battery 1, connected is the direct-current changeover switch 88 whose contact point is switched at an abnormal state or at power interruption of an alternating output voltage.

Furthermore, the controller 85 is a constituent for monitoring or controlling each of operations of the changeover switch 87, rectifier 74, inverter 75, charging control circuit 82 and direct-current changeover switch 88, which make up an electric source main circuit 60. A control output of the controller 85 is output to each of the constituents comprising the inverter 75, the charging control circuit 82, the changeover switch 87 and the direct-current changeover switch 88.

Next is a description of behavior of the power supply unit shown in FIG. 13. In the meantime, the overall control described below is carried out based on outputs of the controller 85. In the figure, when the alternating-current input from the alternating-current source 71 is at a normal voltage level, the direct-current changeover switch 87 is, e.g., allowed to turn off and thereby the alternating-current input is supplied directly to the load. On the one hand, when supplying stabilized power supply output, as indicated by a solid-line arrow in FIG. 13, the direct-current output of the rectifier 14 based on the alternating-current input is supplied to the inverter 75 and the direct-current changeover switch 88 is, e.g., controlled to turn on, so that a desired alternating-current output converted by the inverter 75 (e.g., AC 100V) is supplied to the load. Therewith, the lithium-ion battery 1 is charged up to a required capacity by the charging control circuit 82 to which the direct-current output from the rectifier 74 has been input.

On the contrary, when the alternating-current input has dropped in voltage level due to, e.g., power interruption or the like, the changeover switch 87 and the direct-current changeover switch 88 are controlled to turn on to feed the direct-current output from the lithium-ion battery 1 to the inverter 15 as indicated by a dotted-line arrow and then a desired alternating-current output (e.g., AC 100V) converted in the inverter 15 is supplied to the load.

Figure 14:
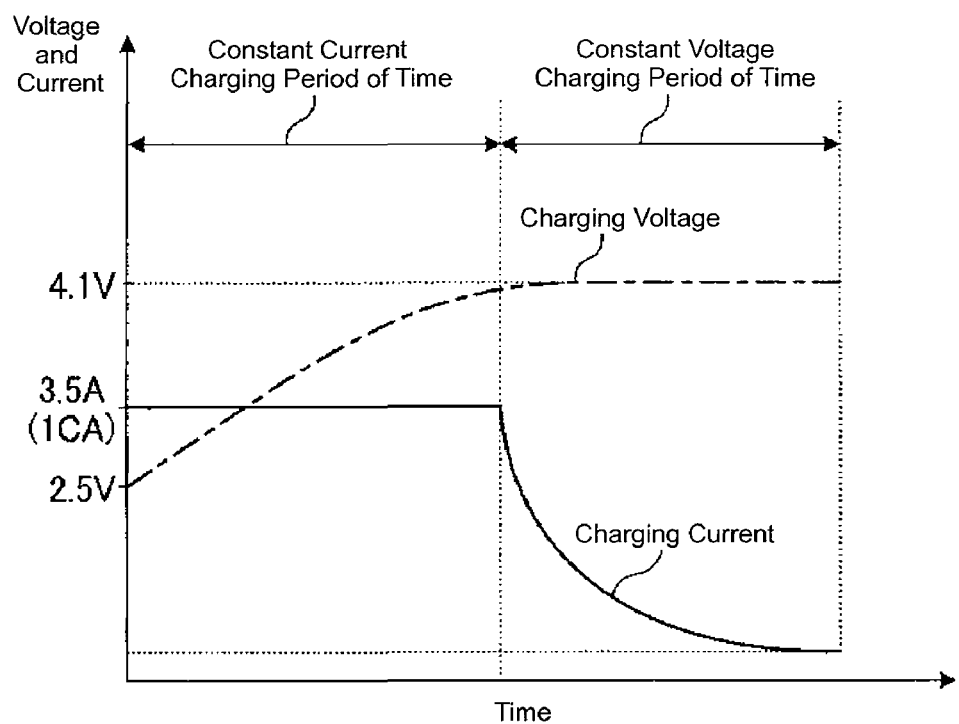
FIG. 14 is a diagram illustrating a general charging method of the lithium-ion battery in the same.

Next is a description of a general charging method of the lithium-ion battery using FIG. 13 and FIG. 14. Here, FIG. 14 is a diagram representing the general charging method of the lithium-ion battery. A graph shown in the figure represents a charging voltage of the lithium-ion battery 1 and a charging current applied to the lithium-ion battery 1, versus a charging time.

As shown in FIG. 14, a charging period to the lithium-ion battery 1 is classified into a constant current charging period of time and a constant voltage charging period of time of time of time. During the constant current charging period of time, a current of 3.5 A (1 CA) is supplied from the charging control circuit 82 to the lithium-ion battery 1. On the contrary, during the constant voltage charging period of time of time of time, a constant voltage of 4.1 V per one cell is applied to the lithium-ion battery 1.

Here, 4.1V, a constant voltage during the constant voltage charging period of time, is referred to as a recommended charging voltage per cell to indicate a battery voltage of a battery cell in switching to the constant-voltage charging.

Besides, in the above description, "C" in "1 C" means an initial letter of "Capacity" and represents a unit of battery capacity. Here, as a definition of "C", "1 hour rate", "5-hour-rate" and "20-hour-rate" or the like are generally used. In the case of the lithium-ion battery, the definition of "5-hour-rate" is general. Therefore, in the present specification, "5-hour-rate" is used. When the lithium-ion battery has been discharged for five hours with a constant current 0.7 A, e.g., if a discharging termination voltage is reached, 7 A×5 h=3.5 Ah is defined as the battery capacity of the 5-hour-rate and then this current value, that is, a current of "3.5 A is inscribed as 1 CA".

Next is a description of a series of operations in charging the lithium-ion battery 1. Additionally, when the lithium-ion battery 1 is used up to the discharging termination voltage, the battery voltage results in, e.g., 2.5V/cell. Accordingly, the description is given based on the fact that the charging of the lithium-ion battery 1 is started from a state where its voltage has come down to 2.5V/cell.

In FIG. 14, the constant-current charging (e.g., 1 C charging) is started by the charging control circuit 82 from a state where the battery voltage is 2.5V. Then, the battery voltage of the lithium-ion battery 1 starts to rise gradually. Thereafter, when the battery voltage of the lithium-ion battery 1 has reached the recommended charged voltage (e.g., 4.1V), the charging is switched to the constant-voltage charging. By the start of the constant-voltage charging, a battery voltage rise of the lithium-ion battery 1 is controlled. During the constant-voltage charging period of time, the charging current of the lithium-ion battery 1 goes on making a sharp decline. Finally, when the charging current has become equal to or less than a given current (e.g., 50 mA or less), the charging is terminated.

In addition, in the example described above, the description has been given by taking charging with a 1 CA charging current for example. Not limiting to the 1 CA charging current, however, it is also possible to perform gradually the charging with a charging current of, e.g., 0.4 A (0.11 CA).

Figure 15:
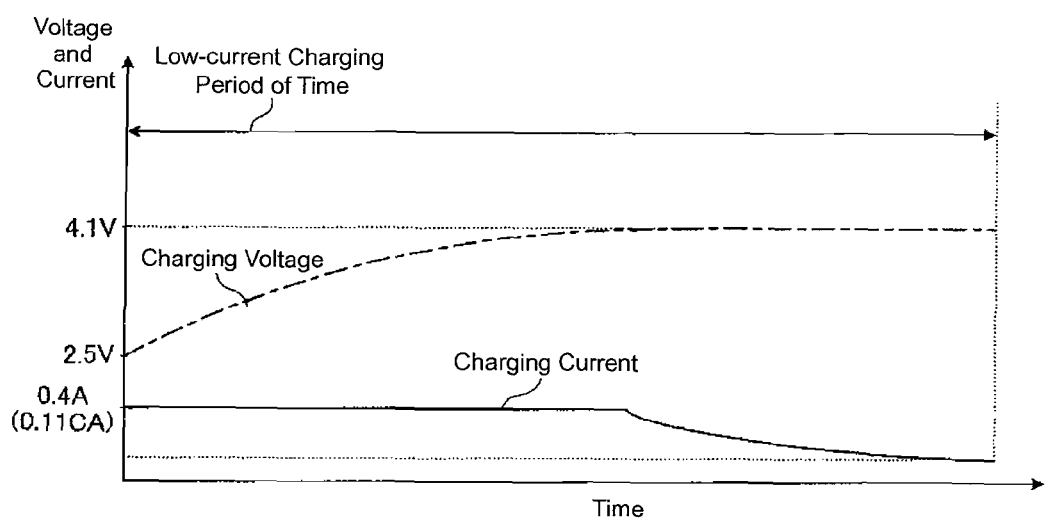
FIG. 15 is a diagram illustrating a charging method of the lithium-ion battery in the same.

And now, the charging method shown in FIG. 14 for the lithium-ion battery 1, that is, a charging method of performing the constant-voltage charging after the constant-current charging has been completed based on a function of the charging control circuit possesses such an advantage that degradation of the battery characteristic of the lithium-ion battery 1 can be restrained to thus allow high-reliability charging as compared to a charging method of using a constant-current charging in attempt only to improve charging efficiency. In the reliable prevention of smoking and ignition of the lithium-ion battery, however, a large issue is involved in the method. Then, the detailed description thereof is given latter On one hand, FIG. 15 is a diagram representing a charging method of the lithium-ion battery according to the present invention. A graph shown in the diagram shows, as in FIG. 14, a charging voltage of the lithium-ion battery 1 and a charging current applied to the lithium-ion battery 1 versus a charging time.

In FIG. 15, starting from the battery voltage of 2.5 V, the lithium-ion battery with, e.g., 5 Ah capacity begins to be charged, by the charging control circuit 82, based on a given current with the given current defined as an upper limit of the charging current (e.g., 0.4 A(0.11 CA)). Namely, in the charging method of the lithium-ion battery according to the present invention, the upper limit of the charging current applied to the lithium-ion battery is set as equal to or less than the given current in contrast to the general charging method for the lithium-ion battery shown in FIG. 14. Additionally, in FIG. 15, during an initial to a middle charging period, the charging current applied to the lithium-ion battery 1 is shown to be approximately steady. The charging current is not necessary, however, to be held approximately constant over the period. In other words, the charging current applied to the lithium-ion battery 1 is not necessary to be approximately steady as shown in FIG. 14, while the charging current may be limited to a current equal to or less than the given current.

Further, during the middle and terminal charging periods, the constant-voltage control such as the charging method of the lithium-ion battery according to the conventional art shown in FIG. 14 (switching to the constant-voltage control) need not be practiced.

On the other hand, as to judgment of a charging termination, as is the case with the method shown in FIG. 14, the charging may be terminated when the charging current has decreased to a value equal to or less than a given value (e.g., 50 mA or less). In addition, during the middle to the terminal charging period, as shown in FIG. 15, the charging current goes on decreasing naturally and hence the constant-voltage control need not be practiced as is done in the conventional art. The reason for this is that when a charging function of the electric power supply unit operates properly, the charging current decreases naturally as the battery voltage of the lithium-ion battery increases, while if such a situation has occurred that an excessive voltage is applied to the lithium-ion battery due to malfunction of the charging function of the electric power supply unit, impedance of the lithium-ion battery itself increases before smoking and ignition of the lithium-ion battery occurs, so that currents applied to the lithium-ion battery are limited.

Thus, the charging method according to the present invention can suppress a temperature rise attributable to heat generation of the lithium-ion battery 1 itself by taking advantage of the characteristics that a current applied to the lithium-ion battery is automatically limited regardless of a normal condition or malfunction condition of the charging function of the electric power supply unit. Even if the worst comes to the worst such as to generate a series of chance failures, smoking and ignition attributable to the temperature rise of the lithium-ion battery 1 can be prevented.

Figure 16A:
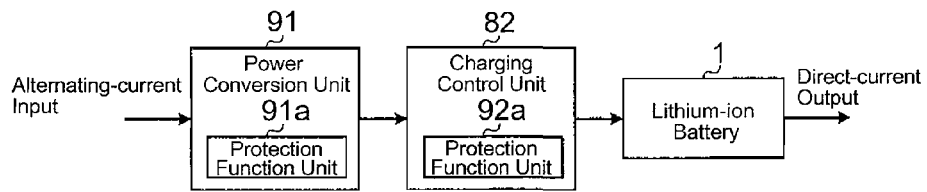
FIG. 16A is a functional block diagram where a charging control function is extracted from the power supply circuit shown in FIG. 13 in the same.

FIG. 16A is a functional block diagram of charging control functions extracted from the power supply circuit shown in FIG. 13. In the figure, a power converter 91 is a function unit corresponding to the rectifier 74 as in the configuration of FIG. 13. A protection function unit 91a within the power converter 91 is a functional unit for overcurrent protection such as, e.g., a breaker and a fuse which cut off a circuit of overcurrent flow. Further, a charging controller 82 is a functional unit corresponding to the charging control circuit 82 and the controller 85 as in the configuration of FIG. 13. A protection function unit 92a within the charging controller 82 is a functional unit for protecting overvoltage so as not to impress overvoltage on the lithium-ion battery 1.

Figure 16B:
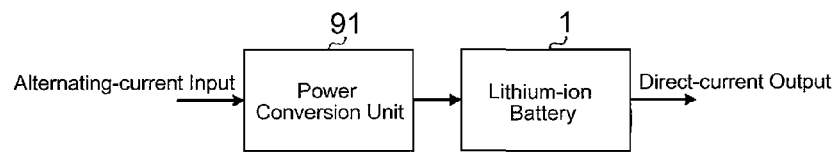
FIG. 16B is a functional block diagram where a function of a protection function unit has been lost in the functional block diagram of FIG. 16A in the same.

Whereas FIG. 16B is a functional block diagram representing a charging control function when a function of the protection function unit has been lost in the functional block diagram of FIG. 16A. The functional block diagram shown in FIG. 16B assumes a situation where the charging control is continued with its false safe function inoperative due to a series of chance failures developed. An overcurrent protection function of a protection function unit 91a has the objective of protecting a circuit against a comparatively large quantity of currents such as, e.g., a rush current or the like. Accordingly, unless an extremely large quantity of currents flows, the overcurrent protection function doesn't operate. Smoking and ignition accidents of the lithium-ion battery 1 is, however, attributable mainly to the temperature rise of the lithium-ion battery 1 itself as described later, the smoking and ignition accidents might occur even while the protection function unit 91a operates properly.

Further, when the protection function unit 92a of the charging controller 82 has gone wrong, an overvoltage protection function comes to a standstill. In this case, e.g., in a secondary circuit connected with a transformer incorporated commonly into the charging controller 82, a control loop becomes off-balance to generate a peak-voltage output from the power converter 91 to a transformer secondary winding tap connected with individual battery cells. Suchlike situation is assumed. A functional block diagram shown in FIG. 16B is drawn to be assumed that suchlike a series of chance failures is caused to happen and in this case a maximum output voltage of the power converter 91 results in direct application to the lithium-ion battery 1.

In order to realize a protection operation in the case like this, such a circuitry may be configured that impedance of the power converter 91 itself viewed from, e.g., its output side is set to be greater than internal impedance of the lithium-ion battery 1. Further, if assuming only that a series of chance failures has occurred to thereby make the protection function to be entirely nonfunctional, the function of the charging controller 82 is not required and an output of the power converter 82 may be allowed to be output directly to the lithium-ion battery 1.

Figure 17:
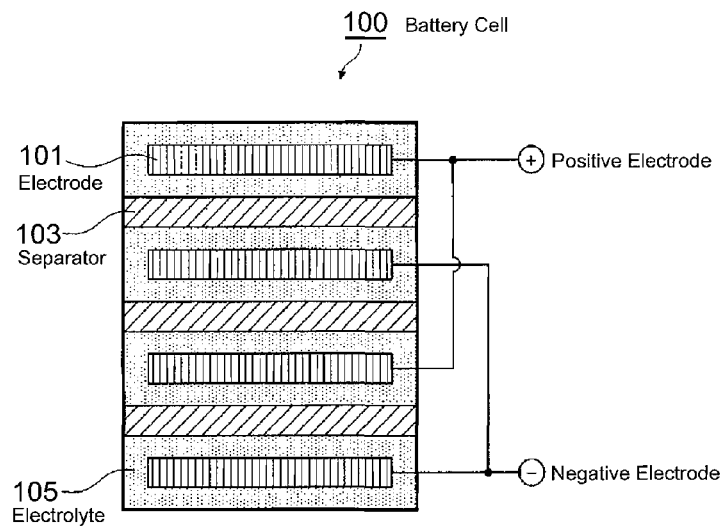
FIG. 17 is a typical cross-sectional view illustrating an internal structure of a single cell of the lithium-ion battery in the same.

FIG. 17 is a typical cross-sectional view representing an internal structure of the lithium-ion battery 1 applied in the present embodiment. Battery cell 100 shown in the figure is a lithium-ion battery 100 in which one positive or negative-terminal is parallel-connected to make up the battery cell and has a three-layered structure of the positive-terminal/a separator/the negative-terminal. An electrolyte 105 is filled within the battery cell and an terminal 101 is each provided in the electrolyte partitioned by the separator 103. Further, each terminal is alternately connected with each other to form the positive and negative terminals.

Next is a simple description of the principle and behavior of the lithium-ion battery. In FIG. 17, as materials of the terminals 101 of the lithium-ion battery, e.g., lithium manganate excellent in cyclic use, e.g., at a high voltage is employed as the positive-terminal, while as the negative-terminal, a material applied with a graphite-based material is employed which has high capacity and is excellent in voltage-flatness property and further is high crystalline. For the separator 103, e.g., polyolefin porous film is employed, while for the electrolyte 105, e. g., an organic electrolyte containing Li ions is employed. The behavior of the lithium-ion battery is as follows: first, lithium within the positive-terminal begins to dissolve into ions in charging to pass through the separator 103, moving to a negative-terminal side. Inversely, the lithium ions move to a positive-terminal side in discharging. Thus, the lithium-ion battery functions as a battery by traversing of the lithium ions via the separator 103 between the positive and negative-terminals.

Figure 18:
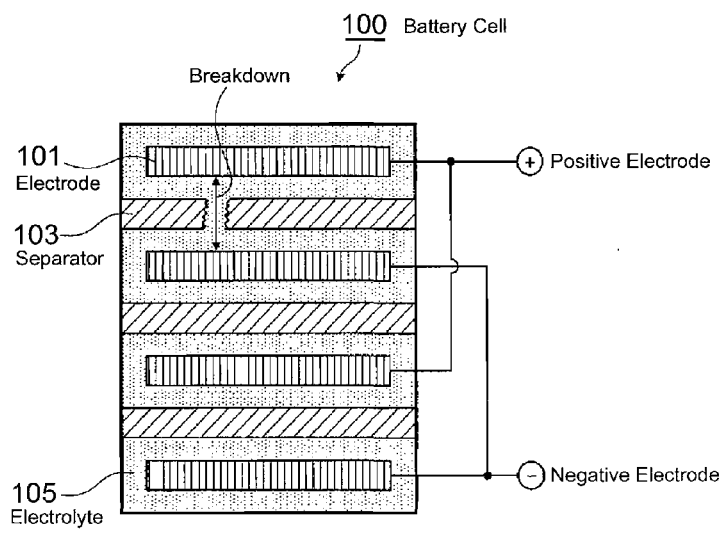
FIG. 18 is a typical cross-sectional view illustrating an internal state when a battery cell 50 shown in FIG. 5 causes smoking and ignition.

FIG. 18 is a typical cross-sectional view representing an internal state when the battery cell shown in FIG. 17 gives rise to smoking and ignition. In the figure, first, it is noted that the battery cell 100 is under a condition of the temperature near a point A (126 deg C.) in FIG. 19 described later. At this time, the separator 103 formed as the polyolefin porous film, e.g., shrinks to close its own hole. This situation operates so as to stop a flow of the lithium ions, thus making the transition to a safe side of the battery operation as a battery performance. When the temperature rise of the battery cell 100 continues and then reaches a point equal to or more than the C point (165 deg C.) in FIG. 19 described later, the separator expands and its fluidized deformation is caused to finally break itself as shown in the figure. Then, crystal of a metal separated out on the terminals grows to short-circuit the positive and negative-terminals via the parts broken. As a result, the battery cell 100 goes thermally out of control, leading to causing smoking or ignition.

The forgoing is a description of the mechanism of the smoking or ignition accident when focusing on the internal condition of the battery cell 100. Next, as a different example from the forging background technology, a description is given about a characteristic change of the battery cell 100 which leads to the smoking or the ignition accident in terms of an electric characteristic phase of the battery cell 100.

Figure 19:
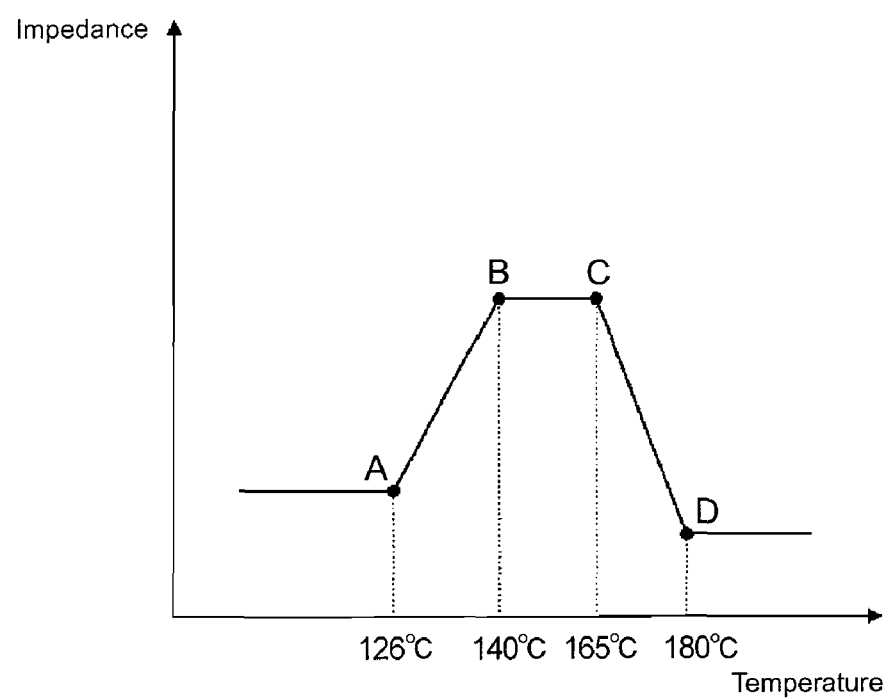
FIG. 19 is a diagram illustrating an impedance characteristic of a battery cell 100 versus temperature.

FIG. 19 is a diagram representing an impedance-temperature characteristic of the battery cell. A zone ranging from the A point (126 deg C.) to the B point (140 deg C.) in the figure is one where the separator 103 operates so as to close the hole of itself by its thermal shrinkage. In this zone, as the flow of the lithium ions decrease, the impedance increases. In addition, near the A point, as shown in the figure, the impedance of the lithium-ion battery exhibits a characteristic of making the transition from an approximate constant value to an ascending value.

Further, a zone ranging from the B point (140 deg C.) to the C point (165 deg C.) in the figure is one where the closed state of the separator 103 hole makes the transition from the state described above to a partial break of the separator 103. In this zone, as a change of the flow of the lithium ions is small, the impedance is held approximately constant.

Further, a zone ranging from the C point (165 deg C.) to the D point (180 deg C.) in the figure is one where the separator 103 breaks partially and besides the metallic crystal separated out on the terminals grows, thus leading to the short-circuit between the positive and negative-terminals. In this zone, as the flow of the lithium ions passing through the broken parts increase, the impedance decreases.

In the last place, a zone beyond the D point (180 deg C.) in the figure is one where a short-circuited state has occurred between the positive and negative-terminals in the separator 103. In this zone, as the short-circuited state has occurred between the positive and negative-terminals, the impedance is small and is held constant.

Figure 20:
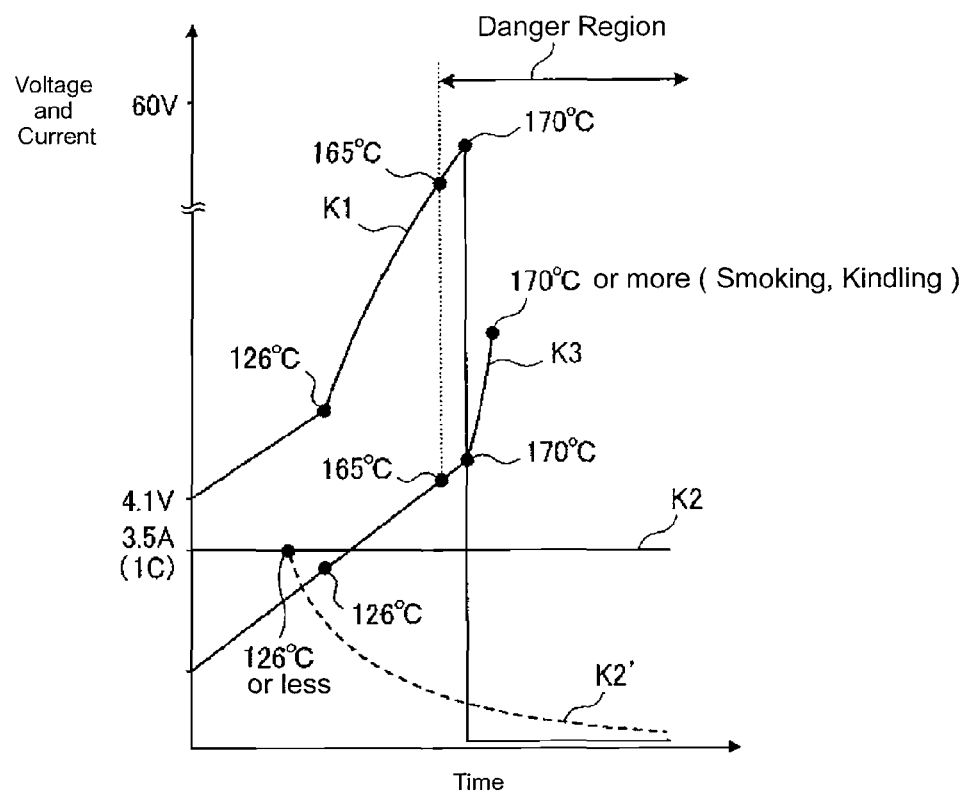
FIG. 20 is an explanatory diagram illustrating a context where when charging is implemented using a normal charging method, the lithium-ion battery causes smoking and ignition.

Next, using FIG. 20 having an axis of ordinate indicating voltage and current differently from FIG. 19 having an axis of ordinate indicating temperature, a description is given about a context where the lithium ion battery leads to smoking and ignition when charged using a usual charging method shown in FIG. 14 in a state where the protection function has been lost as shown in FIG. 16B. In addition, FIG. 20 is a diagram for describing the context where the lithium ion battery leads to smoking and ignition when charged using the usual charging method.

In FIG. 20, the curve K1 denotes a charged voltage of the lithium ion battery versus charging time, the curve K2 denotes a charging current applied to the lithium ion battery versus charging time when the protection function has been lost, the curve K2' denotes a charging current applied to the lithium ion battery versus charging time when the protection function is normal, and the curve K3 denotes temperatures of the lithium ion battery versus charging time.

In FIG. 20, at the normal time, such normal performance is practiced as to make the transition from a constant-current charging zone to a constant-voltage charging zone when the temperature of the lithium ion battery is at a given temperature under 126 deg C. as shown in the curve K2' and thereby the charging current to the lithium ion battery decreases. Hence, the temperature of the lithium ion battery doesn't reach 165 deg C., thus generating no accident leading to smoking and ignition.

On the contrary, e.g., when the protection function has been lost, the excessive charging state is continued, e.g., as shown in the curve K3 and as a result, the temperature of the lithium ion battery rises linearly with time, as shown in FIG. 20, from the A point (126 deg C.) to the C point (165 deg C.) that is an impedance descending temperature. Thereafter, the smoking and the ignition are caused in association with a drastic temperature rise (170 deg C. or higher). Further, as shown in the curve K1, the charged voltage of the lithium ion battery rises linearly to the A point (126 deg C.) and rises rapidly from the temperature 126 deg C. to the C point (165 deg C.) that is the second impedance descending temperature to fall at a stroke in the vicinity of 170 deg C. In addition, the rapid descending characteristic in the vicinity of 170 deg C. indicates occurrence of short-circuiting between the terminals in the battery cell.

The fact described below becomes clear from the impedance characteristic shown in FIG. 19, the characteristic curves shown in FIG. 20 or the like. The impedance of the lithium-ion battery has a tendency to increase until the impedance descending temperature is reached or due to its nearly constant value even if the protection function is lost (e.g., denoting the state, shown in FIG. 16B, where a series of chance failures has occurred, so that the protection function has become entirely unable to function), the charging current decreases. On the contrary, the impedance of the lithium-ion battery has a tendency to descend at temperature subsequent to the impedance descending temperature and hence the charging current increases when the protection circuit function has been lost. Accordingly, if the temperature of the lithium-ion battery can be reliably controlled so as not to exceed the C point (165 deg C.) that is the impedance descending temperature, even if the protection function has been lost, the smoking and ignition of the lithium-ion battery can be reliably prevented. The charging method of the lithium-ion battery, shown in FIG. 4, according to the present invention realizes the function described above. Namely, by performing constant-current charging applying a small current e.g., on the order of 11 CA, the temperature of the lithium-ion battery can be allowed to be surely held at the critical temperature or lower, thus permitting the smoking and ignition of the lithium-ion battery to be surely prevented.

Incidentally, throughout the foregoing entire description, a set value of the charging current supplied to the lithium-ion battery has been described as 0.11 CA. The set value may be, however, determined based on, e.g., an experimental value. The charging current supplied to the lithium ion battery, e.g., is taken as a parameter and then the temperature when the charging current is applied to the lithium-ion battery is measured. In a characteristic curve thus measured, the charging current supplied to the lithium ion battery may be set as a value at which no temperature rise generates in the lithium ion battery.

In addition, it is considered that the impedance characteristic shown in FIG. 19 differs according to an overall structure of a battery cell, a material used for an terminal and a separator, or an electrolyte or the like. Accordingly, the impedance descending temperature where the impedance begins to make the transition from an approximately constant value to a descending tendency is preferably measured for each battery cell employed.

Figure 21:
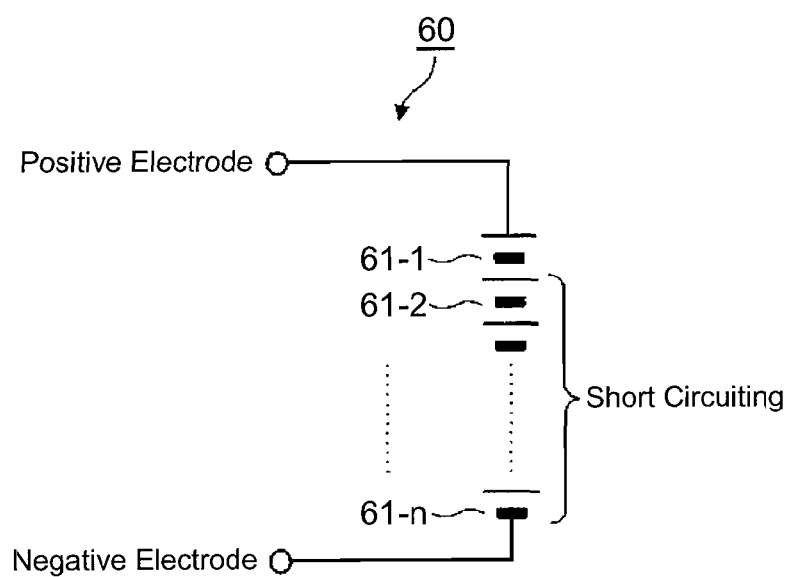
FIG. 21 is a diagram illustrating a lithium-ion battery constituted by series-connecting a plurality of battery cells.

FIG. 21 is a diagram representing a lithium-ion battery built up by a plurality of series-connected battery cells. The lithium-ion battery 60 shown in the figure is constituted by series-connecting a plurality of battery cells 61-1. 61-2, . . . ,61-$n$. In the case of the lithium-ion battery, charging that applies 4.1 (or power restriction circuit) V per cell is implemented and therefore e.g., in the configuration of FIG. 21 where the plurality of the battery cells 61-1. 61-2, . . . ,61-$n$ are series-connected, defining n=15 results in applying 62V between the positive and negative-terminals of the lithium-ion battery 60. On the contrary, if the battery cells 61-2. 61-2, . . . ,61-$n$ are all short-circuited, then, a voltage of about 62V is applied to the battery cell 61-1. Accordingly, also on such an occasion as this, the smoking or ignition of the lithium-ion battery is likely to be induced. In addition, if one battery cell gives rise to short-circuiting of its terminal, the other battery cells are highly likely to give rise to also a successive short-circuiting of their terminals.

Meanwhile, due to applying the constant-current charging by using a small current on the order of 0.11 CA in the present embodiment, this charging method can be applied also to the lithium-ion battery of the structure as shown in FIG. 21, thus preventing the smoking and ignition of the lithium-ion battery reliably.

As described above, according to the present embodiment, the constant-current charging is applied to the lithium-ion battery by using a current equal to or less than a given current (e.g., 0.11 CA). Hence, even if a series of chance failures has occurred, the smoking or ignition of the lithium-ion battery can be reliably prevented.

Further, according to the present embodiment, the protection circuit for reliably preventing the smoking or ignition of the lithium-ion battery can be simplified. Hence, a manufacturing cost increase can be restrained.

Furthermore, according to the present embodiment, a protection function for reliably preventing smoking and ignition of the lithium-ion battery can be simplified and hence an increase in manufacturing cost can be controlled.

In addition, the present invention is not limited to the embodiments described above and modifications are possible without any departure from the gist of the present invention. For example, the present invention can be applied to all electric equipment such as a laminate type lithium-ion battery pack, a laminate type lithium-ion battery charger, a power supply unit equipped with a laminate type lithium-ion battery, a UPS, a mobile phone, home electric appliances or the like.

What is claimed is:

1. A method for safety protection of a secondary battery, comprising:

limiting a charging power to a first level lower than a level causing an absolute maximum rating loss that is a boundary value of a region of safe operation to thereby input the limited charging power that is an energy amount input per hour to said secondary battery, wherein an equality Pmax=(Tmax−Ta)/($\theta_{c-a}+\theta_{j-c}$) is satisfied, where Tmax denotes an absolute maximum rating temperature defined as a dissolution temperature of a separator inside cells of said second battery, Pmax denotes said absolute maximum rating loss at that time, Ta denotes an ambient temperature, $\theta_{c-a}$ denotes thermal resistance between a cell surface temperature and the ambient temperature, and $\theta_{j-c}$ denotes thermal resistance between a central portion of the cell and the cell surface temperature, respectively.

2. A device for safety protection of a secondary battery, comprising:

an input terminal connected with a charging electric source side to feed charging power to said secondary battery;

an output terminal connected with a secondary battery side; and an electric power limiting means for limiting said charging power input to said input terminal to a lower level than a level causing an absolute maximum rating loss that is a boundary value of a region of safe operation to thereby output a limited charging power that is an energy amount input per hour to said output terminal, wherein an equality Pmax=(Tmax−Ta)/($\theta_{c-a}+\theta_{j-c}$) is satisfied, where Tmax denotes an absolute maximum rating temperature defined as a dissolution temperature of a separator inside cells of said second battery, Pmax denotes said absolute maximum rating loss at that time, Ta denotes an ambient temperature, $\theta_{c-a}$ denotes thermal resistance between a cell surface temperature and the ambient temperature, and $\theta_{j-c}$ denotes thermal resistance between a central portion of the cell and the cell surface temperature, respectively.

* * * * *